(12) United States Patent
Tsai

(10) Patent No.: US 7,398,990 B2
(45) Date of Patent: Jul. 15, 2008

(54) HAND TRUCK

(76) Inventor: Haiming Tsai, P.O. Box 6-9, Tainan (TW)

( * ) Notice: Subject to any disclaimer, the term of this patent is extended or adjusted under 35 U.S.C. 154(b) by 115 days.

(21) Appl. No.: 11/581,289

(22) Filed: Oct. 17, 2006

(65) Prior Publication Data
US 2008/0088117 A1    Apr. 17, 2008

(51) Int. Cl.
*B62B 1/04*    (2006.01)
(52) U.S. Cl. .................. 280/652; 280/655.1; 280/47.18; 280/47.27
(58) Field of Classification Search ................ 280/651, 280/652, 654, 655, 655.1, 47.18, 47.27
See application file for complete search history.

(56) References Cited

U.S. PATENT DOCUMENTS

| | | | | |
|---|---|---|---|---|
| 3,443,821 A | * | 5/1969 | Alexander | 280/659 |
| 3,998,476 A | * | 12/1976 | Kazmark, Sr. | 280/655 |
| 4,284,287 A | * | 8/1981 | Esposito | 280/655.1 |
| 4,546,995 A | * | 10/1985 | Kassai | 280/655 |
| 5,024,458 A | * | 6/1991 | Kazmark et al. | 280/645 |
| 5,127,664 A | * | 7/1992 | Cheng | 280/655 |
| 5,476,282 A | * | 12/1995 | Dahl | 280/651 |
| 5,803,471 A | * | 9/1998 | DeMars et al. | 280/40 |
| 5,941,543 A | * | 8/1999 | Kazmark, Jr. | 280/47.29 |
| 5,971,424 A | * | 10/1999 | Ingalls | 280/654 |
| 5,984,327 A | * | 11/1999 | Hsieh et al. | 280/47.24 |
| 6,053,514 A | * | 4/2000 | Su | 280/40 |
| 6,866,290 B2 | * | 3/2005 | Tsai | 280/655 |
| 6,971,654 B2 | * | 12/2005 | Amsili | 280/47.2 |
| 7,044,484 B2 | * | 5/2006 | Wang | 280/47.27 |
| D522,708 S | * | 6/2006 | Chang | D34/24 |

* cited by examiner

Primary Examiner—Jeffrey J Restifo

(57) ABSTRACT

A hand truck includes a bottom base, a reinforcing member, a positing device and a handle. The bottom base consists of a U-shaped tube and a bottom plate combined vertically with a lower end of the U-shaped tube, which has two elongate side vertical portions provided with a lengthwise center hole. The reinforcing member has two side vertical tubes and two lateral rods fixed between the two side vertical tubes, which fit tightly around an intermediate section of the two side vertical portions of the U-shaped for upgrading the strength of the U-shaped tube. The position device is to stabilize the handle at an adjusted position after moved up and down and adjusted in its height relative to the U-shaped tube.

1 Claim, 3 Drawing Sheets

HAND TRUCK

BACKGROUND OF THE INVENTION

1. Field of the Invention

This invention relates to a hand truck, particularly to one having a reinforcing member added to a U-shaped tube of a bottom base so as to upgrade the strength and the rigidity of the hand truck, facilitating the use of the hand truck and prolonging its service life.

2. Description of the Prior Art

A conventional hand truck shown in FIG. 1 includes a handle 10 possible to be hidden in a U-shaped tube 12 combined on a bottom base 11. The U-shaped tube 12 sustains the weight of the handle 10 and the load that the hand truck carries thereon, So if the U-shaped tube 12 has not enough strength and rigidity, it will disfigure or loosen owing to changing torque caused by the load, with its service life possible to be shortened in addition to uneasy handling of the hand truck.

SUMMARY OF THE INVENTION

This invention has been devised to offer a hand truck having an upgraded structural strength and rigidity.

The feature of the invention is an reinforcing member consisting of two side vertical tubes and two lateral rods fixed between the two side vertical tubes, which respectively have a lengthwise center hole of a little larger size than the outer size of two side vertical portions of a U-shaped tube of a bottom base. So the two side vertical tubes may tightly fit around an intermediate section of the two side vertical portions of the U-shaped tube, and the U-shaped tube may be upgraded to have enough strength and rigidity to resist heavy load placed on the hand truck.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
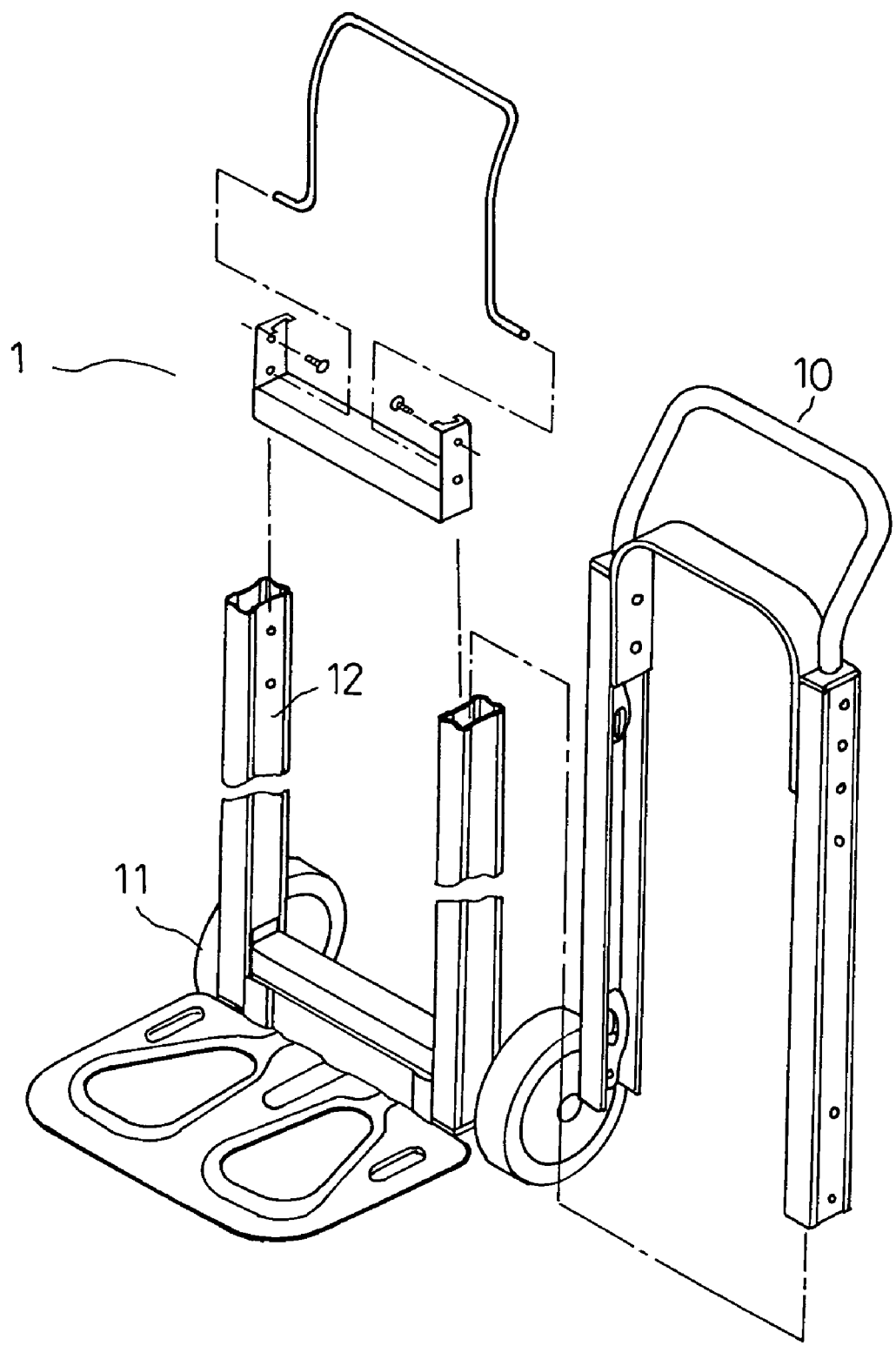
FIG. 1 is an exploded perspective view of a conventional hand truck.
Figure 2:
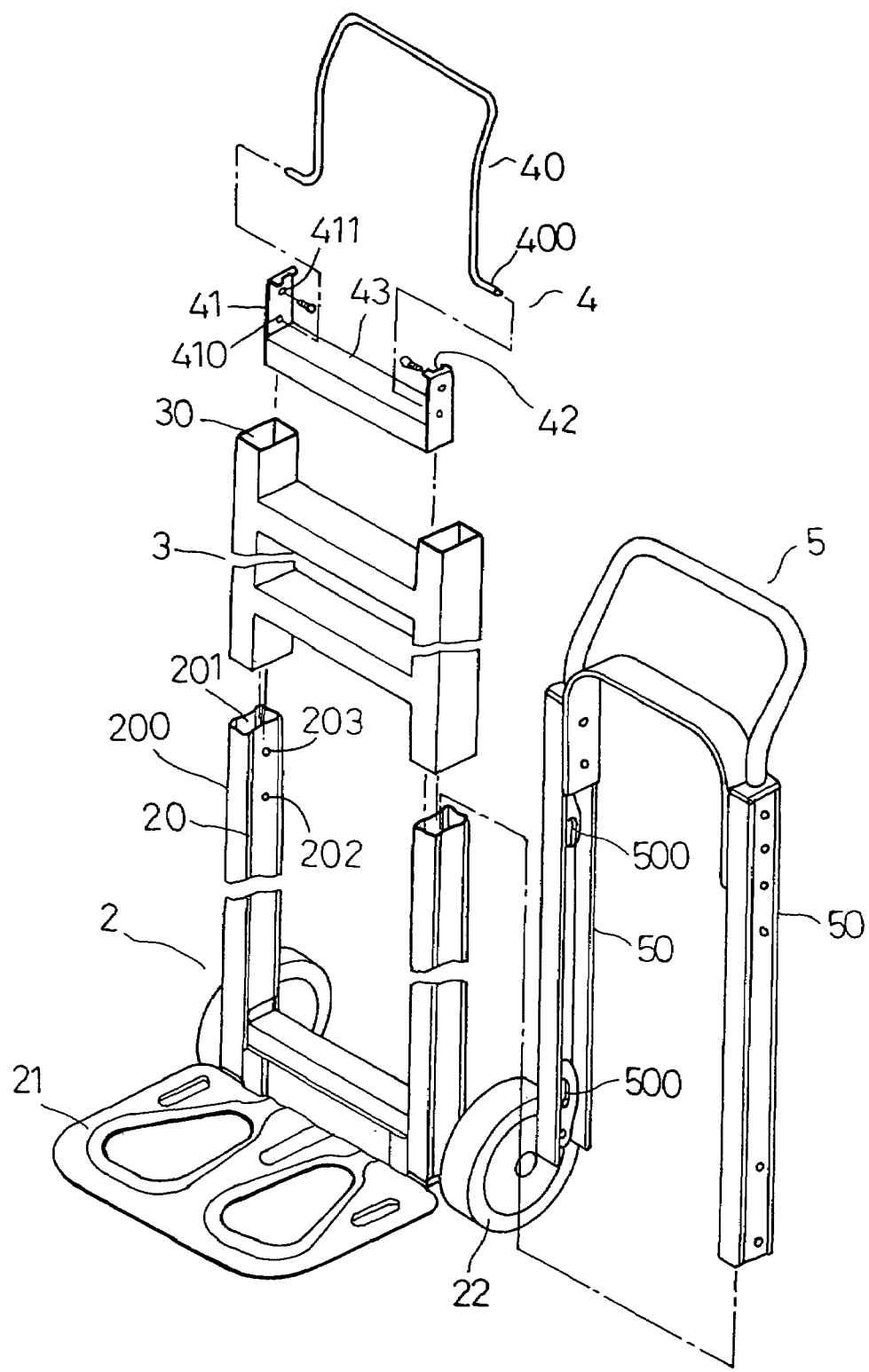
FIG. 2 is an exploded perspective view of a hand truck in the present invention; and, FIG. 3 is a perspective view of the hand truck in the present invention.
Figure 3:
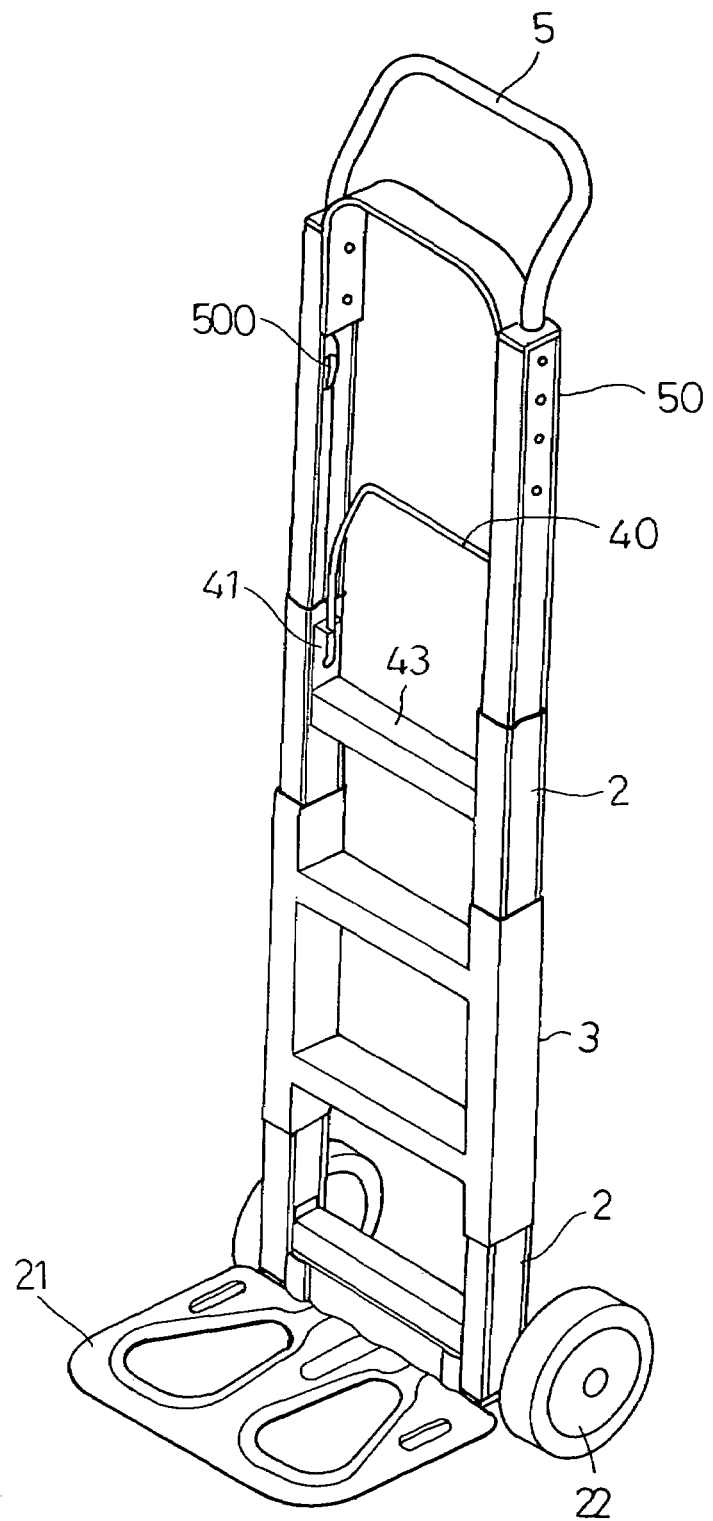

A preferred embodiment of a hand truck in the present invention, as shown in FIGS. 2 and 3, includes a bottom base 2, a reinforcing member 3, a positioning device 4 and a handle 5 as main components combined together.

The bottom base 2 is composed of a U-shaped tube 20, a bottom plate 21 horizontally combined with the bottom end of the U-shaped tube 20, and two wheels 22 combined at two ends of the bottom side of the U-shaped tube 20 respectively. Further the U-shaped tube 20 is provided with two side vertical portions 200 and a lengthwise center hole 201 formed in two side vertical portions 200 respectively. Further, the two side vertical portions 200 have a position hole 202 and a fix hole 203 in an inner side.

The reinforcing member 3 is shaped as H, having two horizontal rods between two side vertical tubes 30,which respectively have a longwise center hole of a little larger size than the outer size of the two side vertical portions 200 of the U-shaped tube 20 so that the two side vertical tubes 30 may fit around the intermediate section of the two side vertical portions 200 of the U-shaped tube 20.

The positioning device 4 is composed of a pull rod 40, two side positioning strips 41 provided with a position hole 410 and a fix hole 411, a stop projections 42 formed at an upper end of the two side portioning strips 41 and a lateral rod 43 having two ends fixed with the two side positioning strips 41. The pull rod 40 is shaped as U, having two bent-outward ends 400 fitting in the position hole 410 of the two side positioning strips 41 and further in the position hole 202 of the two side vertical portions 200 of the U-shaped tube 20.

The handle 5 is U-shaped, having two elongate side vertical posts 50 extending partially in the center hole 201 of the two side vertical portions 200 of the U-shaped tube 20. Further the two side vertical posts 50 are provided with plural positioning holes 500 spaced apart equidistantly for the bent-outward ends 400 of the pull rod 40 to fit one of them optionally for stabilizing the handle 5 after the height of the handle 5 is adjusted.

In assembling, first the two side vertical tubes 30 of the reinforcing member 3 are fitted from above around the two side vertical portions 200 of the U-shaped tube 20, pushed down to and fixed at the intermediate section of the two side vertical portions 200 of the U-shaped tube 20. Then the positioning device 4 is threadably combined with the two side vertical portions 200 of the U-shaped tube 20, by screwing a screw through the fix holes 411 and 203. Finally the two side vertical posts 50 are inserted in the center holes 201 of the two side vertical portions 200 of the U-shaped tube 20, and the handle 5 is adjusted in its position by moving up and down with the two side vertical posts 50 along in the center holes 201 of the two side vertical portions 200 and then positioned at the adjusted height by the pull rod 40, which is handled to let the two bent-outward ends 400 inserted in the position holes 410, 202 and then in one of position holes 500 of the two side vertical posts 50 after the height of the handle 5 relative to the U-shaped tube 20. Then the hand truck is finished in assembly, ready for use.

The hand truck according to the invention has the following advantages as can be seen from the foresaid description.

1. The re inforcing member 3 is fitted around the intermediate section of the two side vertical portions 200 of the U-shaped tube 20 so that the U-shaped tube 20 does not disfigure at all, upgraded in its strength and rigidity.

2. The reinforcing member 3 is structured simple, easy to assemble.

3. The reinforcing member 3 can permit the U-shaped tube 20 to have a small center hole 201 so small things may not easily fall into the center hole 201.

While the preferred embodiment of the invention has been described above, and it will be recognized and understood that various modifications may be made therein and the appended claims are intended to cover all such modifications that may fall thin the spirit and scope of the invention.

What is claimed is:

1. A hand truck comprising:

a bottom base consisting of a U-shaped tube, a bottom plate and two wheels, said bottom plate combined with a lower end of said U-shaped tube in a vertical condition, said U-shaped tube having two side vertical portions of some length and a center hole formed in each said side vertical portion, a reinforcing member having two side vertical tubes and two lateral rods fixed between said two side vertical tubes, said two side vertical tubes having a center hole of a size a little larger than an outer size of said two side vertical portions of said U-shaped tube of said bottom base so that said two side vertical tubes may fit around an intermediate section of said two side vertical portions of said U-shaped tube for reinforcing strength and rigidity of said U-shaped tube;

a positioning device consisting of a pull rod, a lateral rod, two side strips fixed with two ends of said lateral rod, a stop member fixed at an upper end of said two side strip, said pull rod shaped U and having two bent-outward ends to fit in a position hole in said two side vertical portions of said U-shaped tube and further in said position hole of said two side vertical portion of said U-shaped tube, said two side strips having a position hole and a fix hole for said two bent-outward ends of said pull rod to fit therein;

a handle having a U-shaped handle and two elongate side vertical posts, said two elongate vertical posts provided with plural position holes spaced apart equidistantly for said two bent-outward ends of said pull rod to fit therein optionally so that said handle may be adjusted in its height and then be positioned relative to said U-shaped tube by handling said pull rod so that said two bent-outward ends may fit in said position hole of said position device, of said U-shaped tube and of said handle for stabilizing said handle at an adjusted height.

\* \* \* \* \*